United States Patent
Oelke

(10) Patent No.: US 9,575,667 B2
(45) Date of Patent: *Feb. 21, 2017

(54) SHAPING I/O TRAFFIC BY MANAGING QUEUE DEPTH IN FRACTIONAL INCREMENTS

(71) Applicant: Dell International L.L.C., Round Rock, TX (US)

(72) Inventor: Dan Oelke, Otsego, MN (US)

(73) Assignee: Dell International L.L.C., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/082,043

(22) Filed: Mar. 28, 2016

(65) Prior Publication Data
US 2016/0210059 A1 Jul. 21, 2016

Related U.S. Application Data

(63) Continuation of application No. 14/310,300, filed on Jun. 20, 2014, now Pat. No. 9,329,964.

(51) Int. Cl.
*G06F 3/06* (2006.01)
*H04L 29/06* (2006.01)
(Continued)

(52) U.S. Cl.
CPC .......... *G06F 3/0611* (2013.01); *G06F 3/0619* (2013.01); *G06F 3/0665* (2013.01);
(Continued)

(58) Field of Classification Search
CPC ............. G06F 11/3048; G06F 11/3034; G06F 11/3433; G06F 11/3452; G06F 2201/875;
(Continued)

(56) References Cited

U.S. PATENT DOCUMENTS 6,456,597 B1 * 9/2002 Bare ................. H04L 29/12009
370/252
6,580,715 B1 * 6/2003 Bare ....................... H04L 45/12
370/252

(Continued)

OTHER PUBLICATIONS

Epping, Duncan. "SDRS and Auto-Tiering solutions—The Injector", Yellow-Bricks, Aug. 5, 2011. Accessed on the Internet Sep. 15, 2014 <URL: http://www.yellow-bricks.com/2011/08/05/sdrs-and-auto-tiering-solutions-the-injector/> (2 pages).

(Continued)

*Primary Examiner* — Yonas Bayou
(74) *Attorney, Agent, or Firm* — Winthrop & Weinstine, P.A.

(57) ABSTRACT

A method for managing input/output (I/O) traffic in an information handling system. The method may include receiving electronic I/O requests from a network-attached server, determining a queue depth limit, monitoring latency of processed electronic I/O requests, and processing received electronic I/O requests. The number of electronic I/O requests permitted to be processed over a period of time may be based on a mathematical combination of the queue depth limit and a latency of processed electronic I/O requests. The determined queue depth limit may be a fractional value.

18 Claims, 1 Drawing Sheet

(51) Int. Cl.
*H04L 12/26* (2006.01)
*G06F 13/16* (2006.01)
*G06F 11/30* (2006.01)
*G06F 11/34* (2006.01)

(52) U.S. Cl.
CPC ........ *G06F 3/0689* (2013.01); *G06F 11/3034* (2013.01); *G06F 11/3048* (2013.01); *G06F 11/3433* (2013.01); *G06F 11/3452* (2013.01); *G06F 13/161* (2013.01); *G06F 13/1642* (2013.01); *H04L 43/0888* (2013.01); *H04L 63/0807* (2013.01); *G06F 2201/875* (2013.01)

(58) Field of Classification Search
CPC ...... G06F 3/0659; G06F 3/0611; G06F 3/067; G06F 13/1642; G06F 3/061
See application file for complete search history.

(56) References Cited

U.S. PATENT DOCUMENTS

| | | | |
|---|---|---|---|
| 7,613,945 B2 | 11/2009 | Soran et al. | |
| 8,042,163 B1* | 10/2011 | Karr .................. | G06F 3/062 713/164 |
| 8,468,292 B2 | 6/2013 | Aszmann et al. | |
| 8,850,428 B2* | 9/2014 | Dotan ................ | G06F 9/455 711/114 |
| 2004/0243687 A1* | 12/2004 | Sakaguchi .......... | G06F 12/0871 709/213 |
| 2004/0249904 A1* | 12/2004 | Moore ............... | H04L 29/06 709/216 |
| 2004/0250113 A1* | 12/2004 | Beck ................. | H04L 63/12 726/27 |
| 2005/0108582 A1* | 5/2005 | Fung ................. | G06F 1/3203 713/300 |
| 2008/0244690 A1* | 10/2008 | Kulkarni ............ | G06F 21/552 726/1 |
| 2009/0044272 A1* | 2/2009 | Jarrett .............. | G06F 21/568 726/23 |
| 2013/0152099 A1* | 6/2013 | Bass ................. | G06F 9/5027 718/103 |
| 2013/0254458 A1 | 9/2013 | Pittelko | |
| 2015/0120907 A1* | 4/2015 | Niestemski ........ | H04L 67/1097 709/224 |
| 2015/0263978 A1* | 9/2015 | Olson ............... | H04L 67/00 709/226 |

OTHER PUBLICATIONS

Gulati, Ajay et al. "BASIL: Automated IO Load Balancing Across Storage Devices", 8th USENIX Conference on File and Storage Technologies, Feb. 25, 2010 (14 pages).
Gulati, Ajay et al. "PARDA: Proportional Allocation of Resources for Distributed Storage Access", 7th USENIX Conference on File and Storage Technologies, Feb. 26, 2009 pp. 85-98).
Merchant, Arif et al. "Maestro: Quality-of-Service in Large Disk Arrays", Proceedings of the 8th ACM International Conference on Autonomic Computing, Jul. 14-18, 2011 (10 pages).

* cited by examiner

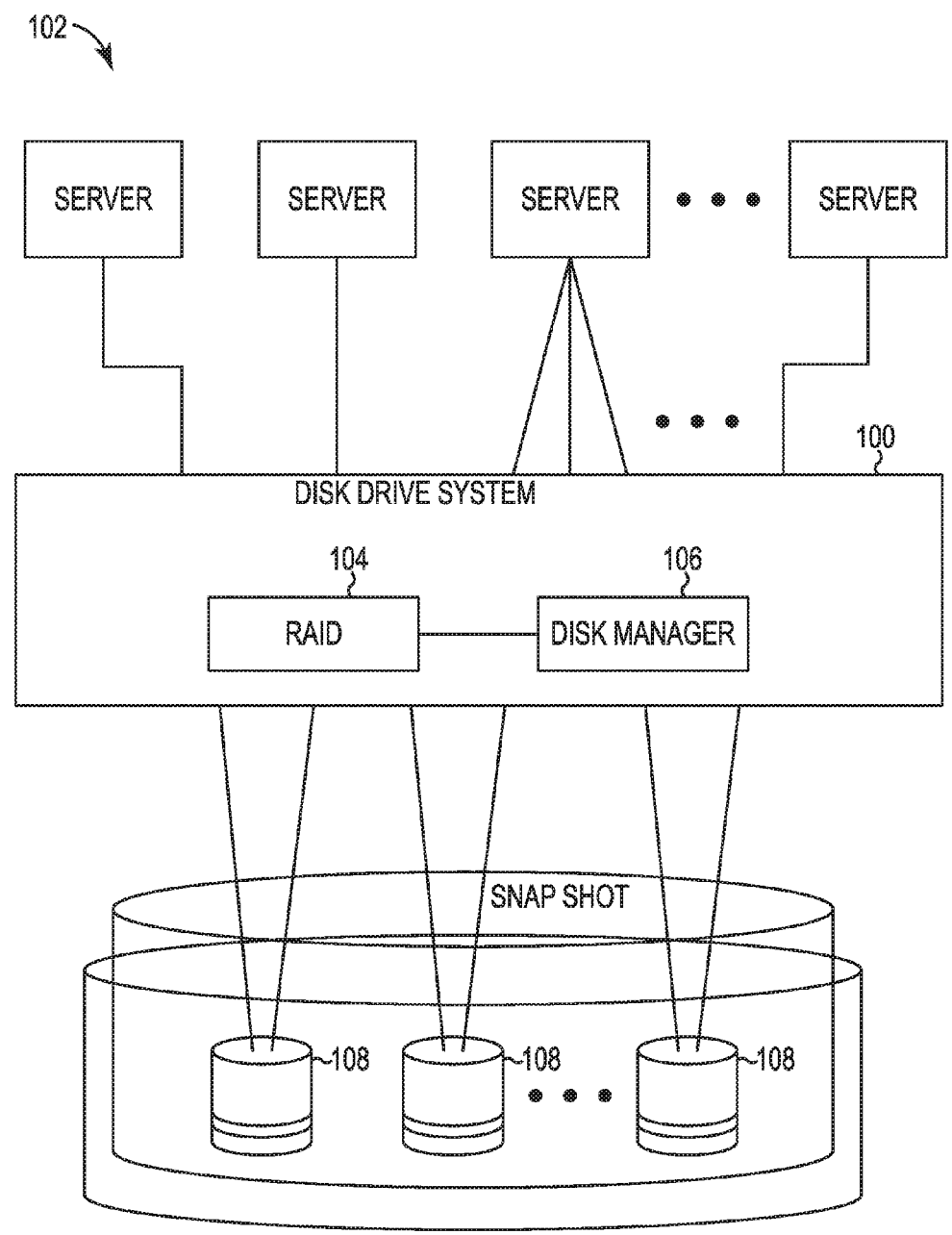

US 9,575,667 B2

SHAPING I/O TRAFFIC BY MANAGING QUEUE DEPTH IN FRACTIONAL INCREMENTS

CROSS-REFERENCE TO RELATED APPLICATIONS

This application is a continuation of U.S. patent application Ser. No. 14/310,300, titled "SHAPING I/O TRAFFIC BY MANAGING QUEUE DEPTH IN FRACTIONAL INCREMENTS," filed Jun. 20, 2014, the disclosure of which is hereby incorporated by reference herein in its entirety.

FIELD OF THE INVENTION

The present disclosure relates to managing input/output (I/O) request volume in information handling systems. Particularly, the present disclosure relates to increasing the efficiency of processing I/O requests through the use of a fractionalized queue depth.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may process I/O read and/or write requests sent from one or more servers to store, write, or access data. Where multiple I/O requests are sent to the system, various methods may be used to manage the I/O requests. Some methods include using input/output operations per second (IOPS) or bandwidth limits. Another method looks to the number of I/O requests that have been sent to the system but not yet completed by the system—the queue depth—to manage I/O request processing. Traditional queue depth management schemes, however, are often based on integer increments. Specifically, a queue depth threshold may not increase or decrease by fractional amounts under traditional queue depth management methods, thus in some cases leading to an inability to alter the permitted queue depth in small percentage increments. For example, a queue depth threshold of 3 may only be increased or decreased by a minimum of 33%, or one integer, according to traditional queue depth management methods.

Thus, there is a need in the art for improved systems and methods for managing queue depth in fractionalized increments. Particularly, there is a need in the art for systems and methods for using fractionalized queue depth to increase efficiency among servers or applications, each with a large volume of I/O requests.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one embodiment, relates to a method for managing input/output (I/O) traffic in an information handling system. The method may include receiving electronic I/O requests from a network-attached server, determining a queue depth limit, monitoring latency of processed electronic I/O requests, and processing received electronic I/O requests. The number of electronic I/O requests permitted to be processed over a period of time may be based on a mathematical combination of the queue depth limit and a latency of processed electronic I/O requests. In further embodiments, processing received I/O requests may include managing a virtual bucket comprising a number of virtual tokens, each token representative of authorization for an I/O request to be processed, permitting a received I/O request to be processed if the virtual bucket comprises a number of virtual tokens greater than zero, and decrementing the number of virtual tokens by at least one. In particular embodiments, virtual tokens may be added to the virtual bucket at any given time $t_x$ according to the equation: $Tokens(t_x)=QueueDepthLimit*TimeElapsed(t_x-t_{x-1})/Latency$, wherein $Tokens(t_x)$ gives a value corresponding to a number of virtual tokens to be added to the virtual bucket at time $t_x$; QueueDepthLimit is the determined queue depth limit; $TimeElapsed(t_x-t_{x-1})$ is an amount of time elapsed between time $t_x$ and a time $t_{x-1}$, where $t_{x-1}$ is a point in time prior to time $t_x$; and Latency is a latency of processed electronic I/O requests that have completed during the time elapsed between time $t_x$ and a time $t_{x-1}$. $Tokens(t_x)$ may be calculated at periodic intervals, random intervals, and/or when an I/O request is received. In some embodiments, the QueueDepthLimit may be a fractional value.

The present disclosure, in another embodiment, also relates to a method for managing input/output (I/O) traffic in an information handling system. The method may include receiving electronic I/O requests from a plurality of network-attached servers, determining a queue depth limit for each of the plurality of network-attached servers, monitoring latency of processed electronic I/O requests, and processing received electronic I/O requests for each of the network-attached servers. The number of electronic I/O requests permitted to be processed for a given network-attached server over a period of time may be based on a mathematical combination of the queue depth limit determined for that network-attached server and a latency of processed electronic I/O requests. The queue depth limit for any one of the plurality of network-attached servers could be different than at least one other of the plurality of network-attached servers. Processing received I/O requests for each of the network-attached servers may include, for each of the network-attached servers, managing a virtual bucket comprising a number of virtual tokens, each token representative of authorization for an I/O request from at least that network-attached server to be processed, permitting a received I/O request from that network-attached server to be processed if the virtual bucket comprises a number of virtual tokens greater than zero, and decrementing the number of virtual tokens by at least one. In particular embodiments, virtual tokens are added to the virtual bucket at any given time $t_x$ according to the equation: $Tokens(t_x)$ =QueueDepthLimit*TimeElapsed$(t_x-t_{x-1})$/Latency, wherein Tokens$(t_x)$ gives a value corresponding to a number of virtual tokens to be added to the virtual bucket at time $t_x$; QueueDepthLimit is the determined queue depth limit for that network-attached server; TimeElapsed$(t_x-t_{x-1})$ is an amount of time elapsed between time $t_x$ and a time $t_{x-1}$, where $t_{x-1}$ is a point in time prior to time $t_x$; and Latency is a latency of processed electronic I/O requests that have completed during the time elapsed between time $t_x$ and a time $t_{x-1}$. Tokens$(t_x)$ may be calculated for each network-attached server at periodic intervals and/or when an I/O request is received from that network-attached server. In some embodiments, the QueueDepthLimit for at least one of the network-attached servers may be a fractional value.

The present disclosure, in still another embodiment, relates to an information handling system including a data storage system receiving I/O requests from two or more network-attached servers, and a controller managing the data storage system. The controller may be configured to store a queue depth limit for each of the plurality of network-attached servers, monitor latency of processed I/O requests, and process received I/O requests for each of the network-attached servers, wherein the number of I/O requests permitted to be processed for a given network-attached server over a period of time is based on a mathematical combination of the queue depth limit determined for that network-attached server and a latency of processed I/O requests. In some embodiments, the queue depth limit for at least one of the plurality of network-attached servers may be a fractional value.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying FIGURES, in which:

FIG. 1 is a schematic diagram of a data storage system that may benefit from the systems and methods for shaping I/O traffic of the present disclosure.

DETAILED DESCRIPTION

The present disclosure relates to novel and advantageous I/O volume management in information handling systems. Particularly, the present disclosure relates to algorithms for managing queue depth in fractional increments.

For purposes of this disclosure, any system or information handling system described herein may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a system or any portion thereof may be a personal computer (e.g., desktop or laptop), tablet computer, mobile device (e.g., personal digital assistant (PDA) or smart phone), server (e.g., blade server or rack server), a network storage device, or any other suitable device or combination of devices and may vary in size, shape, performance, functionality, and price. A system may include random access memory (RAM), one or more processing resources such as a central processing unit (CPU) or hardware or software control logic, ROM, and/or other types of nonvolatile memory. Additional components of a system may include one or more disk drives or one or more mass storage devices, one or more network ports for communicating with external devices as well as various input and output (I/O) devices, such as a keyboard, a mouse, touchscreen and/or a video display. Mass storage devices may include, but are not limited to, a hard disk drive, floppy disk drive, CD-ROM drive, smart drive, flash drive, or other types of non-volatile data storage, a plurality of storage devices, or any combination of storage devices. A system may include what is referred to as a user interface, which may generally include a display, mouse or other cursor control device, keyboard, button, touchpad, touch screen, microphone, camera, video recorder, speaker, LED, light, joystick, switch, buzzer, bell, and/or other user input/output device for communicating with one or more users or for entering information into the system. Output devices may include any type of device for presenting information to a user, including but not limited to, a computer monitor, flat-screen display, or other visual display, a printer, and/or speakers or any other device for providing information in audio form, such as a telephone, a plurality of output devices, or any combination of output devices. A system may also include one or more buses operable to transmit communications between the various hardware components.

While the various embodiments are not limited to any particular type of information handling system, the systems and methods of the present disclosure may be particularly useful in the context of an informational handling system that is or comprises a storage center comprising mass storage devices, such as but not limited to disk drive and solid state drive systems, or virtual disk drive systems, such as that described in U.S. Pat. No. 7,613,945, titled "Virtual Disk Drive System and Method," issued Nov. 3, 2009, U.S. Pat. No. 8,468,292, titled "Solid State Drive Data Storage System and Method," issued Jun. 18, 2013, and U.S. patent application Ser. No. 13/429,511, titled "Single-Level Cell and Multi-Level Cell Hybrid Solid State Drive," filed Mar. 26, 2012, each of which is incorporated by reference herein in its entirety. Such data storage systems allow the efficient storage of data by dynamically allocating user data across a page pool of storage, or a matrix of drive storage blocks, and a plurality of drives based on, for example, RAID-to-disk mapping. In general, dynamic allocation presents a virtual disk or storage device or volume to user servers. To the server, the volume acts the same as conventional storage, such as a disk drive, yet provides a storage abstraction of multiple storage devices, such as RAID (redundant array of independent disks) devices, to create a dynamically sizeable storage device. Data progression may be utilized in such disk drive systems to move data gradually to storage space of appropriate overall cost for the data, depending on, for example but not limited to, the data type or access patterns for the data. In general, data progression may determine the cost of storage in the drive system considering, for example, the monetary cost of the physical storage devices, the efficiency of the physical storage devices, and/or the RAID level of logical storage devices. Based on these determinations, data progression may move data accordingly such that data is stored on the most appropriate cost storage available. In addition, such drive systems may protect data from, for example, system failures or virus attacks by automatically generating and storing snapshots or point-in-time copies of the system or matrix of drive storage blocks at, for example, predetermined time intervals, user configured dynamic time stamps, such as, every few minutes or hours, etc., or at times directed by the server. These time-stamped snapshots permit the recovery of data from a previous point in time prior to the system failure, thereby restoring the system as it existed at that time. These snapshots or point-in-time copies may also be used by the system or system users for other purposes, such as but not limited to, testing, while the main storage can remain operational. Generally, using snapshot capabilities, a user may view the state of a storage system as it existed in a prior point in time.

FIG. 1 illustrates one embodiment of a disk drive or data storage system 100 in an information handling system environment 102, such as that disclosed in U.S. Pat. No. 7,613,945, U.S. Pat. No. 8,468,292, and U.S. patent application Ser. No. 13/429,511, and suitable with the various embodiments of the present disclosure. As shown in FIG. 1, the disk drive system 100 may include a data storage subsystem 104, which may include, but is not limited to, a RAID subsystem, as will be appreciated by those skilled in the art, and a disk or drive manager 106 having at least one disk storage system controller. The data storage subsystem 104 and disk/drive manager 106 can dynamically allocate data across drive space of a plurality of disk drives or other suitable storage devices 108, such as but not limited to optical drives, solid state drives, tape drives, etc., based on, for example, RAID-to-disk mapping or other storage mapping technique. The data storage subsystem 104 may include data storage devices distributed across one or more data sites at one or more physical locations, which may be network connected. Any of the data sites may include original and/or replicated data (e.g., data replicated from any of the other data sites) and data may be exchanged between the data sites as desired.

In the various embodiments of the present disclosure, one or more programs or applications, such as a web browser, and/or other applications may be stored in one or more of the system memories. Programs or applications may be loaded in part or in whole into a main memory or processor during execution by the processor. One or more processors may execute applications or programs to run systems or methods of the present disclosure, or portions thereof, stored as executable programs or program code in the memory, or received from the Internet or other network. Any commercial or freeware web browser or other application capable of retrieving content from a network and displaying pages or screens may be used. In other embodiments, a customized application may be used to access, display, and update information.

Hardware and software components of the present disclosure, as discussed herein, may be integral portions of a single computer or server or may be connected parts of a computer network. The hardware and software components may be located within a single location or, in other embodiments, portions of the hardware and software components may be divided among a plurality of locations and connected directly or through a global computer information network, such as the Internet.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. Computer-executable program code for carrying out operations of embodiments of the present disclosure may be written in an object oriented, scripted or unscripted programming language such as Java, JavaScript, Perl, PHP, Visual Basic, Smalltalk, C++, or the like. However, the computer program code for carrying out operations of embodiments of the present disclosure may also be written in conventional procedural programming languages, such as the C programming language or similar programming languages. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this document, a computer readable medium may be any medium that can contain, store, communicate, or transport the program for use by or in connection with the systems disclosed herein. The computer-executable program code may be transmitted using any appropriate medium, including but not limited to the Internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Various embodiments of the present disclosure may be described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by hardware components, computer-executable program code portions, or combinations thereof. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an ingredient or element may still actually contain such item as long as there is generally no measurable effect thereof.

As indicated above, in some embodiments, an information handling system of the present disclosure may receive I/O requests from one or more, and more typically two or more, servers, applications, or data volumes or may include such servers, applications, or data volumes within the system. These I/O requests may complete in the order in which they are received or based on any other factor(s). However, each server, application, or volume may send I/O requests faster or more frequently than can be processed. As a result, I/O requests are often queued until they can be processed. As indicated above, such I/O requests may be managed by a number of methods, including for example, applying a queue depth threshold based on, for example, a desired number of (TOPS). More specifically, queue depth monitoring may include tracking the number of I/O requests that have been sent from one or more servers, applications, or volumes, but which have not yet completed by the information handling system. A queue depth limit, based for example on a desired IOPS, may be established for the overall system and/or for each server, application, or volume to designate a maximum number of I/O requests that may be queued at any given point in time for the system and/or for each server, application, or volume. Conventionally, a queue depth limit was an integer value, and thus queue depth management conventionally relied solely on an integer-based counting system. More specifically, for example, when an I/O request was received, the queue depth was incremented by an integer value of one. When an I/O request completed, the queue depth was decremented by an integer value of one. If an I/O request was received and incrementing the queue depth caused the value of the queue depth to exceed the established queue depth limit, that I/O was delayed until a previously queued I/O completed. This ensured that no more I/O requests were active than the limit imposed at any point in time. Such an integer-based system does not, however, allow for queue depth management using fractional queue depth limits.

Accordingly, in some embodiments of the present disclosure, a token bucket scheme/algorithm may be used to effectively manage I/O requests, and in some embodiments, may particularly permit managing I/O requests with a more accurate and adjustable fractional queue depth limit. A token bucket scheme may generally be thought of as an authorization system having a virtual bucket into which virtual tokens, each token representing an available authorization for whatever individual actions/tasks the scheme is being used to manage, may be added according to a determined method or at a determined rate. According to one embodiment of the present disclosure, when an I/O request is received by the information handling system, for example from a server, application, or volume, an available token may be removed from the bucket. When the information handling system completes an I/O request, a token may be returned to the bucket. When the bucket is empty of tokens, incoming I/O requests may be held or delayed until a token becomes available, such as when a prior I/O request has completed and its token is returned to the bucket. As may be appreciated, the maximum number of tokens for the bucket, available when no I/O requests are processing, represents a queue depth limit. In such an embodiment, however, the queue depth limit may only be managed to integer values.

Accordingly, in other embodiments of the present disclosure, virtual tokens may be added to the virtual bucket at a predetermined or other calculated or determined rate. As with the embodiments described above, when an I/O request is received by the information handling system, an available token may be removed from the bucket. When there are no more tokens in the bucket, however, incoming I/O requests may be held until more tokens are added to the bucket. According to some embodiments of the present disclosure, tokens may be added pursuant to a predetermined or calculated rate. The rate at which tokens are added to the bucket may be based on any number of various parameters or events, and may be added according to any regular, irregular, or random schedule or intervals.

In one example embodiment, the number of tokens that are added to the bucket at any given point in time, $t_x$, may be based on the following equation:

$$\text{Tokens}(t_x) = \text{QueueDepthLimit} * \text{TimeElapsed}(t_x - t_{x-1}) / \text{Latency}$$

where Tokens($t_x$) (also referred to herein simply as Tokens) is the number of virtual tokens to be added to the virtual bucket at time $t_x$; QueueDepthLimit is a determined, and in some cases predetermined, queue depth threshold or limit; TimeElapsed($t_x - t_{x-1}$) is the amount of time elapsed between time $t_x$ and time $t_{x-1}$, where $t_{x-1}$ is a point in time prior to time $t_x$, and in some cases is the time at which the most recent Tokens calculation was performed; and Latency is a value corresponding to the latency of I/O requests that have completed during the TimeElapsed period. While described above as having the parameters QueueDepthLimit, TimeElapsed, and Latency, any additional parameters may be included in the Tokens equation, and Tokens is not limited to equations having solely the QueueDepthLimit, TimeElapsed, and Latency parameters. Likewise, while Tokens is indicated above as being a particular mathematical combination of QueueDepthLimit, TimeElapsed, and Latency, other mathematical combinations of QueueDepthLimit, TimeElapsed, and Latency, alone or with other parameters, may be utilized and Tokens is not limited to only the particular mathematical combination indicated above. Furthermore, in some embodiments, the result of Tokens may be rounded, such as rounded to the nearest integer, always rounded up, always rounded down, or rounded in any suitable manner. In other embodiments, Tokens need not be rounded, and the virtual bucket need not hold only whole (i.e., integer) tokens. Still further, while described as analogous to a bucket, the virtual bucket described herein may simply be represented by a variable storing a numerical value corresponding to the number of virtual tokens currently held by the bucket, or by any other suitable data representation.

The QueueDepthLimit may be any suitable numerical value, including any fractional value. The QueueDepthLimit may be a predetermined or preselected value or may be based on one or more parameters and/or requirements relating to the information handling system and/or the servers, applications, or volumes from which I/O requests are being received, and/or any other suitable factor or factors. The QueueDepthLimit may be a static value or may change dynamically based on any of such parameters or requirements or other suitable factor or factors.

In some embodiments, Tokens may be calculated periodically according to a predetermined schedule or period. Tokens may additionally or alternatively be calculated, for example, each time an I/O request is received and/or completed or may be based on the satisfaction of any other event or parameter or combinations thereof. In additional or alternative embodiments, Tokens may be calculated at any other regular, irregular, or random intervals or times. As will be recognized, the value for TimeElapsed may vary for any or each calculation.

In some embodiments, Latency may be a smoothed latency value according to a suitable latency smoothing algorithm. An average latency value may alternatively be used.

A scheme for managing I/O requests as described above may dynamically manage queue depth, increasing efficiency of the information handling system. For example, in general, a low latency, and thus a low Latency value for the Tokens equation, may reflect availability for a relatively larger processing load. As such, when Tokens is calculated, more virtual tokens will be added to the bucket, thereby permitting additional I/O requests. Conversely, in general, a high latency, and thus a high Latency value for the Tokens equation, may indicate that the system is already under a relatively higher processing load. As such, when Tokens is calculated, fewer virtual tokens (and in some cases no tokens) will be added to the bucket, thereby queuing more I/O requests. As a result, such a scheme allows the information handling system to dynamically manage I/O requests based on actual, current performance of the system.

As described above, use of a token bucket scheme as described to manage I/O requests and queue depth additionally permits management to fractional queue depth limits. As further described above, in general, the QueueDepthLimit may be a predetermined or preselected value or may be based on one or more parameters and/or requirements relating to the information handling system and/or the servers, applications, or volumes from which I/O requests are being received, and/or any other suitable factor or factors. In one embodiment, the QueueDepthLimit may be representative of, although not necessarily exactly, a queue depth of processing I/Os permitted at any given time. In further embodiments, the QueueDepthLimit may be selected based on a desired average queue depth to be permitted. Permitting QueueDepthLimit to be fractional allows for incremental changes in the desired average queue depth.

As a result of the various embodiments described above, throughput and latency of the information handling system as a whole may remain generally within an efficient range, despite whether the system is experiencing a heavy or light load. Additionally, the above embodiments permit temporary bursts of requests that would otherwise exceed a conventional static queue depth limit to be handled more efficiently.

Furthermore, managing I/O requests via queue depth according to the above algorithm embodiments may allow more efficient balancing of I/O across servers, applications, or volumes of varying capabilities and/or designated importance. Specifically, performance between various servers, applications, and/or volumes may be managed or balanced by manipulating the QueueDepthLimit for each server, application, and/or volume, or combinations thereof. In some embodiments, an overall information handling system queue depth may be determined based on, for example, latency of the system or other parameter or parameters, and the system queue depth may be divided among various servers, applications, and/or volumes within the system. Allocation of queue depth among two or more servers, applications, or volumes may be based on, for example, relative importance and/or latency of the individual servers, applications, or volumes, or of particular drives, disks, or other physical storage devices allocated thereto. However, as noted above, in various embodiments, the latencies of the physical storage devices can affect the calculation of Tokens and thus may naturally distribute resources relatively fairly based on capability and demand.

The above described embodiments for shaping I/O traffic are advantageous over conventional methods such as managing I/O based on the system IOPS or bandwidth limits. For example, according to the various embodiments described herein, I/O requests may be balanced according to a more fair weighting among servers, applications, or volumes competing for the resources. As a specific example, under a conventional I/O management scheme queuing I/O requests based on a threshold IOPS, a first server sending several write requests (typically consuming relatively more processing time) and a second server sending small sequential read requests (typically consuming relatively less processing time) will both be limited by the long latency of the resource intensive operations of the first server. Conversely, managing I/O traffic according to various embodiments disclosed herein can distinguish between relatively more "expensive" I/O requests (in the terms of processing time per I/O request) and relatively less "expensive" I/O requests via the Latency parameter in the Tokens equation, where a low latency would generally translate to availability to take on additional processing load, without regard to the actual number of I/O requests being processed.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

I claim:

1. A method for managing input/output (I/O) traffic in an information handling system, the method comprising:
   receiving electronic I/O requests from a network-attached server;
   determining a queue depth limit;
   monitoring latency of processed electronic I/O requests; and
   processing received electronic I/O requests by:
      managing a virtual bucket comprising a number of virtual tokens, each token representative of authorization for an I/O request to be processed; and
      permitting a received I/O request to be processed if the virtual bucket comprises a number of virtual tokens greater than zero, and decrementing the number of virtual tokens by at least one;
      wherein the number of electronic I/O requests permitted to be processed over a period of time is based on a mathematical combination of the queue depth limit and a latency of processed electronic I/O requests.

2. The method of claim 1, wherein the virtual tokens are added to the virtual bucket at any given time $t_x$ according to the equation:

$$\text{Tokens}(t_x) = \text{QueueDepthLimit} * \text{TimeElapsed}(t_x - t_{x-1}) / \text{Latency}$$

wherein $\text{Tokens}(t_x)$ gives a value corresponding to a number of virtual tokens to be added to the virtual bucket at time $t_x$; QueueDepthLimit is the determined queue depth limit; $\text{TimeElapsed}(t_x - t_{x-1})$ is an amount of time elapsed between time $t_x$ and a time $t_{x-1}$, where $t_{x-1}$ is a point in time prior to time $t_x$; and Latency is a latency of processed electronic I/O requests that have completed during the time elapsed between time $t_x$ and a time $t_{x-1}$.

3. The method of claim 2, wherein $\text{Tokens}(t_x)$ is calculated at periodic intervals.

4. The method of claim 3, wherein $\text{Tokens}(t_x)$ is additionally calculated when an I/O request is received.

5. The method of claim 2, wherein $\text{Tokens}(t_x)$ is calculated at random intervals.

6. The method of claim 2, wherein $\text{Tokens}(t_x)$ is calculated when an I/O request is received.

7. The method of claim 2, wherein the QueueDepthLimit is a fractional value.

8. The method of claim 1, wherein the queue depth limit is a fractional value.

9. The method of claim 1, wherein processing received I/O requests further comprises waiting to process a received I/O request if the virtual bucket comprises a number of virtual tokens less than zero until the virtual bucket receives additional virtual tokens.

10. A method for managing input/output (I/O) traffic in an information handling system, the method comprising:
    receiving electronic I/O requests from a plurality of network-attached servers;
    determining a queue depth limit for each of the plurality of network-attached servers;
    monitoring latency of processed electronic I/O requests; and
    for each of the network-attached servers, processing received electronic I/O requests for that network-attached server by:
       managing a virtual bucket comprising a number of virtual tokens, each token representative of authorization for an I/O request from at least that network-attached server to be processed; and
       permitting a received I/O request from that network-attached server to be processed if the virtual bucket comprises a number of virtual tokens greater than zero, and decrementing the number of virtual tokens by at least one;
       wherein the number of electronic I/O requests permitted to be processed for a given network-attached server over a period of time is based on a mathematical combination of the queue depth limit determined for that network-attached server and a latency of processed electronic I/O requests.

11. The method of claim 10, wherein the queue depth limit for one of the plurality of network-attached servers is different than at least one other of the plurality of network-attached servers.

12. The method of claim 10, wherein the virtual tokens are added to the virtual bucket at any given time $t_x$ according to the equation:

$$\text{Tokens}(t_x) = \text{QueueDepthLimit} * \text{TimeElapsed}(t_x - t_{x-1}) / \text{Latency}$$

wherein $\text{Tokens}(t_x)$ gives a value corresponding to a number of virtual tokens to be added to the virtual bucket at time $t_x$; QueueDepthLimit is the determined queue depth limit for that network-attached server; $\text{TimeElapsed}(t_x - t_{x-1})$ is an amount of time elapsed between time $t_x$ and a time $t_{x-1}$, where $t_{x-1}$ is a point in time prior to time $t_x$; and Latency is a latency of processed electronic I/O requests that have completed during the time elapsed between time $t_x$ and a time $t_{x-1}$.

13. The method of claim 12, wherein $\text{Tokens}(t_x)$ is calculated for each network-attached server when an I/O request is received from that network-attached server.

14. The method of claim 12, wherein $\text{Tokens}(t_x)$ is calculated for each network-attached server at periodic intervals.

15. The method of claim 12, wherein the QueueDepthLimit for at least one of the network-attached servers is a fractional value.

16. The method of claim 10, wherein the queue depth limit for at least one of the network-attached servers is a fractional value.

17. An information handling system comprising:
    a data storage system receiving I/O requests from two or more network-attached servers; and
    a controller managing the data storage system, including:
       storing a queue depth limit for each of the plurality of network-attached servers;
       monitoring latency of processed I/O requests; and
       for each of the network-attached servers, processing received I/O requests for that network-attached server by:

managing a virtual bucket comprising a number of virtual tokens, each token representative of authorization for an I/O request from at least that network-attached server to be processed; and permitting a received I/O request from that network-attached server to be processed if the virtual bucket comprises a number of virtual tokens greater than zero, and decrementing the number of virtual tokens by at least one;

wherein the number of I/O requests permitted to be processed for a given network-attached server over a period of time is based on a mathematical combination of the queue depth limit determined for that network-attached server and a latency of processed I/O requests.

18. The information handling system of claim 17, wherein the queue depth limit for at least one of the plurality of network-attached servers is a fractional value.

* * * * *

UNITED STATES PATENT AND TRADEMARK OFFICE
CERTIFICATE OF CORRECTION

PATENT NO. : 9,575,667 B2  
APPLICATION NO. : 15/082043  
DATED : February 21, 2017  
INVENTOR(S) : Dan Oelke Page 1 of 1

It is certified that error appears in the above-identified patent and that said Letters Patent is hereby corrected as shown below:

In the Specification

Column 7, Line 60, delete "(TOPS)" and insert --(IOPS)-- therefor.

Signed and Sealed this
Eleventh Day of April, 2017

Michelle K. Lee
*Director of the United States Patent and Trademark Office*